United States Patent
Oh et al.

(10) Patent No.: US 7,379,477 B2
(45) Date of Patent: May 27, 2008

(54) APPARATUS AND METHOD FOR EFFICIENTLY TRANSMITTING BROADCASTING CHANNEL UTILIZING CYCLIC DELAY DIVERSITY

(75) Inventors: Hyun-Seok Oh, Incheon (KR); Hee-Jin Roh, Suwon-si (KR); Sung-Soo Kim, Seoul (KR); Min-Goo Kim, Yongin-si (KR)

(73) Assignee: Samsung Electronics Co., Ltd, Suwon-si (KR)

( * ) Notice: Subject to any disclaimer, the term of this patent is extended or adjusted under 35 U.S.C. 154(b) by 222 days.

(21) Appl. No.: 11/149,586

(22) Filed: Jun. 10, 2005

(65) Prior Publication Data

US 2005/0281240 A1   Dec. 22, 2005

(30) Foreign Application Priority Data

Jun. 12, 2004  (KR) .................. 10-2004-0043349

(51) Int. Cl.
*H04J 3/00* (2006.01)
*H04J 1/00* (2006.01)
*H04J 3/06* (2006.01)
*H04Q 11/02* (2006.01)

(52) U.S. Cl. ............... 370/480; 370/430; 370/345; 370/517

(58) Field of Classification Search ........... 370/343, 370/319, 330, 344, 345, 517, 430, 480
See application file for complete search history.

(56) References Cited

U.S. PATENT DOCUMENTS

| | | | |
|---|---|---|---|
| 6,473,467 B1* | 10/2002 | Wallace et al. | 375/267 |
| 6,952,454 B1* | 10/2005 | Jalali et al. | 375/260 |
| 7,139,237 B2* | 11/2006 | Nangia et al. | 370/208 |
| 7,154,976 B2* | 12/2006 | Williams | 375/371 |
| 2002/0154705 A1* | 10/2002 | Walton et al. | 375/267 |
| 2002/0181509 A1* | 12/2002 | Mody et al. | 370/480 |
| 2002/0196731 A1* | 12/2002 | Laroia et al. | 370/206 |
| 2004/0042390 A1 | 3/2004 | Celebi et al. | |
| 2004/0082356 A1* | 4/2004 | Walton et al. | 455/522 |
| 2006/0093067 A1* | 5/2006 | Jalali et al. | 375/299 |
| 2006/0262714 A1* | 11/2006 | Tarokh et al. | 370/208 |

FOREIGN PATENT DOCUMENTS

JP   2004-096753   3/2004

OTHER PUBLICATIONS

"On Cyclic Delay Diversity in OFDM Based Transmission Schemes," International OFDM Workshop, Sep. 2002, pp. 1-5, Bossert M., et al., XP002338873.
"Antenna Diversity for OFDM Using Cyclic Delays," 8th Symposium on Comm. And Vehicle. Tech., Oct. 1, 2001, pp. 13-17, Witrisal K., et al., XP002348090.
"Transmit/Receive-Antenna Diversity Techniques for OFDM Systems," Multi-Carrier Spread-Spectrum and Related Topics, Sep. 1, 2001, vol. 13, No. 5, pp. 531-538; Dammann A., et al., XP002348091.

* cited by examiner

*Primary Examiner*—Nay Maung
*Assistant Examiner*—Andrew Wendell
(74) *Attorney, Agent, or Firm*—Roylance, Abrams, Berdo & Goodman, LLP (57) ABSTRACT

Disclosed are an apparatus and a method for efficiently transmitting a broadcasting channel by means of cyclic delay diversity in an OFDM mobile communication system. The method comprises the steps of setting each transmitter to have different delay values, the transmitter providing a service to adjacent service areas, generating OFDM signals including the broadcasting data by said each transmitter, delaying the OFDM signals by means of the different delay values, and transmitting the delayed OFDM signals by means of each transmitting apparatus.

12 Claims, 4 Drawing Sheets

APPARATUS AND METHOD FOR EFFICIENTLY TRANSMITTING BROADCASTING CHANNEL UTILIZING CYCLIC DELAY DIVERSITY

PRIORITY

This application claims the benefit under 35 U.S.C. §119 (a) of an application entitled "Apparatus and Method for efficiently Transmitting Broadcasting Channel utilizing Cyclic Delay Diversity" filed in the Korean Intellectual Property Office on Jun. 12, 2004 and assigned Ser. No. 2004-43349, the entire contents of which are hereby incorporated by reference.

BACKGROUND OF THE INVENTION

1. Field of the Invention

The present invention relates to an Orthogonal Frequency Division Multiplex Access (OFDMA)/Code Division Multiple Access (CDMA) mobile communication system. More particularly, the present invention relates to an apparatus and a method for efficiently transmitting a broadcasting channel by means of cyclic delay diversity.

2. Description of the Related Art

Generally, an OFDM/CDMA mobile communication system, which is proper for high speed data transmission through a radio channel, uses a plurality of mutually orthogonal carriers.

An OFDM scheme has been adopted as a wireless standard scheme in such fields as Digital Audio Broadcasting (DAB), and Digital Video Broadcasting-Terrestrial (DVB-T). In addition, the OFDM scheme is used in the Institute of Electrical and Electronics Engineers (IEEE) 802.11a Local Area Network (LAN) standard, and the IEEE 802.11a Metropolitan Area Network (MAN) standard. Accordingly, an OFDM scheme is being discussed as a representative scheme in the 4G generation mobile communication and the next generation mobile communication systems.

Transmission of an OFDM symbol is performed by coding the symbol and the transmission is influenced by the previous symbol during transmission through a multi-path channel. In order to prevent interference between OFDM symbols, guard intervals longer than a maximum delay spread of a channel are inserted between continuous symbols. Accordingly, an OFDM symbol period is a sum of an effective symbol period during which data is actually transmitted and a guard interval. Further, a reception side removes the guard interval, extracts data during the effective symbol period, and performs a demodulation of the data. Herein, a guard interval obtained by copying signals of a last portion in an effective symbol interval is inserted in order to prevent orthogonality from being destroyed which may occur due to a delay of a sub-carrier. The guard interval obtained by copying signals of a last portion in an effective symbol interval will be referred to as a Cyclic Prefix (CP).

Figure 1:
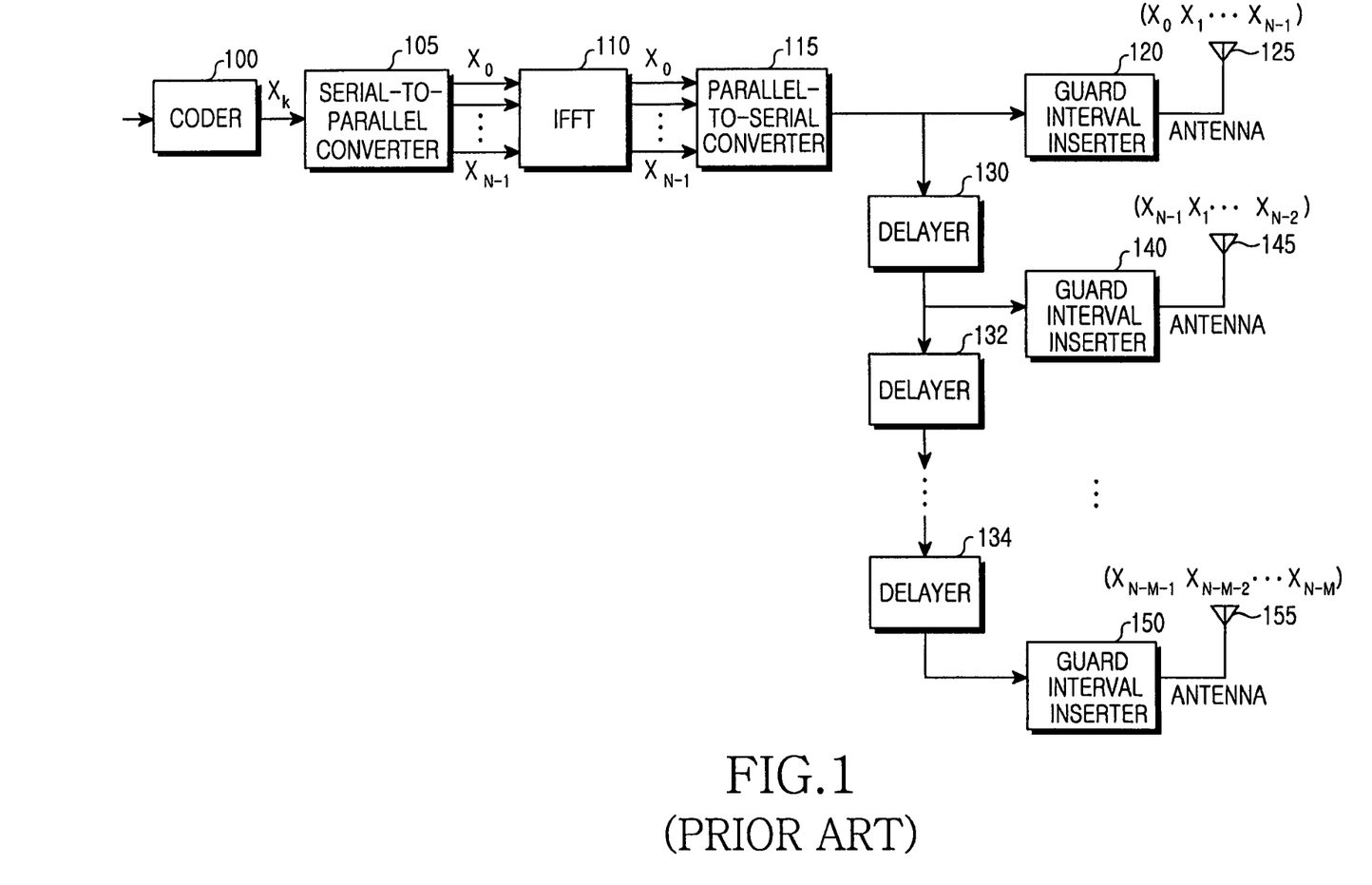
FIG. 1 is a block diagram of a conventional OFDM system supporting a multi-carrier delay diversity modulation.

FIG. 1 is a block diagram of a conventional OFDM system supporting a multi-carrier delay diversity modulation.

Referring to FIG. 1, a coder 100 codes an input data sequence and outputs the coded data sequence $X_k$ to a serial-to-parallel converter 105. The serial-to-parallel converter 105 divides the data sequence into N sample data and outputs the divided sample data in parallel to an Inverse Fast Fourier Transform (IFFT) unit 110. The IFFT unit 110 inputs the N sample data output from the serial-to-parallel converter 105, performs an IFFT for the N samples of data, and outputs N number of OFDM data samples in parallel to a parallel-to-serial converter 115. The parallel-to-serial converter 115 receives the OFDM sample data output from the IFFT unit 110, converts the OFDM sample data into serial data, and outputs the serial data. The guard interval inserter 120 copies a G number of last OFDM data samples from the OFDM sample data in the OFDM symbol constructed from the N number of OFDM data samples, inserts the copied data sample as a guard interval prior to the OFDM symbol, and outputs the guard interval and the OFDM symbol. Herein, the OFDM symbol including the guard interval will be referred to as an OFDM transmission symbol. Accordingly, an antenna unit 125 receives the OFDM transmission symbol output from the guard interval inserter 120, converts the OFDM transmission symbol into analog signals, which are OFDM signals, and outputs the OFDM signals.

Herein, a base station generates different multi-path channels from the OFDM signal by using a predetermined delay, and this will be referred to as a multi-carrier delay diversity modulation scheme. According to the multi-carrier delay diversity modulation scheme, when the base station transmits signals through multiple antennas, each antenna delays the signals by a predetermined amount of time and then transmits the delayed signals. This scheme is different from a Space-Time Block Coding (STBC) scheme and a Space-Time Trellis Coding (STTC) scheme which improves transmit diversity using multiple antennas.

The multi-carrier delay diversity modulation scheme may flexibly perform a space-time coding regardless of the number of transmit antennas, as compared with the STBC scheme. Further, the multi-carrier delay diversity modulation scheme has low complexity and may operate without limitation in the number of transmit antennas, as compared with the STTC scheme.

In other words, the multi-carrier delay diversity modulation scheme may perform the space-time coding without being limited by the number of transmit antennas, and may maximize the diversity performance without greatly changing an existing transmission or reception scheme.

Further, the multi-carrier delay diversity modulation scheme may use an existing reception method for reception.

That is, a codeword sequence $(x_0, x_1, \ldots, x_{N-1})$ having a block length of N output from the serial-to-parallel converter 105 is modulated into N sub-carriers by the IFFT unit 110, and is then multi-carrier-modulated by Equation 1 below.

$$X_n = \frac{1}{\sqrt{N}} \sum_{k=0}^{N-1} X_k e^{j2\pi kn/N}, n = 0, 1, \ldots, N-1 \qquad \text{Equation 1}$$

In Equation 1, k represents a sub-carrier index, n represents a time domain sample index, $X_k$ represents a frequency domain symbol sequence, and $X_n$ represents a time domain symbol sequence.

Accordingly, in the multi-carrier delay diversity modulation scheme as illustrated in FIG. 1, signals transmitted through M transmit antennas may be expressed by a tapped delay line having a length of M−1. A delay interval is identical to a sample interval T of the sequence $\{X_n\}$. Further, a codeword may be expressed by Equation 2 below.

$$C = \begin{pmatrix} x_0 & x_1 & \cdots & x_{N-1} \\ x_{N-1} & x_0 & \cdots & x_{N-2} \\ \vdots & \vdots & \ddots & \vdots \\ x_{N-M+1} & x_{N-M+2} & \cdots & x_{N-M} \end{pmatrix} \quad \text{Equation 2}$$

In Equation 2, an $M^{th}$ antenna unit 155 transmits signals $(x_{N-M}, x_{N-M-1}, \ldots, x_{N-M+1})$ obtained by cyclically shifting the sequence $(x_0, x_1, \ldots, x_{N-1})$ by M times. The codeword C will be referred to as a cyclic delay codeword because of the cyclic delay shifting scheme as described above.

According to the multi-carrier delay diversity modulation scheme, a second guard interval inserter 140 receives the N number of OFDM data samples delayed by T, copies a G number of OFDM data samples from the last OFDM sample data of the OFDM sample data, inserts the copied G number of data samples as a guard interval prior to the OFDM symbol, and outputs the guard interval and OFDM symbol. Accordingly, a second antenna unit 145 transmits OFDM signals corresponding to $x_{N-1}, x_1, \ldots, x_{N-2}$. Further, an $M^{th}$ guard interval inserter 150 receives signals obtained by cyclically delaying once again signals already cyclically delayed (M−1) times, that is, signals $(x_{N-M}, x_{N-M-1}, \ldots, x_{N-M+1})$ obtained by cyclically shifting the sequence $(x_0, x_1, \ldots, x_{N-1})$ M times. The $M^{th}$ guard interval inserter 150 copies G number of OFDM data samples, inserts the guard interval into the copied OFDM sample data, and outputs the OFDM sample data. An $M^{th}$ antenna unit 155 transmits OFDM signals corresponding to $x_{N-M-1}, x_{N-M-2}, \ldots, x_{N-M}$.

In the prior art, the OFDM signals delayed by T were cyclically delayed, thereby obtaining an additional frequency diversity gain. In other words, when the delay diversity is employed, a scheme of cyclically delaying only one sample according to each antenna has been used.

When the base station transmits a broadcasting channel, it is necessary to consider if delayed signals delaying only one sample as described above may cause a transmit diversity gain to a user terminal in a different cell. This is because a transmit diversity gain may occur or interference may increase due to a system characteristic such as the length of a guard interference interval, the cell type, the number of sectors, or the beam pattern. That is, it is necessary to provide a transmission scheme capable of transmitting OFDM signals more efficiently in a blanket area where reception of the broadcasting channel is poor, a hot spot area where user terminals are crowded, or an outskirt area where user terminals appear occasionally.

SUMMARY OF THE INVENTION

Accordingly, the present invention has been made to solve the above-mentioned problems occurring in the prior art, and it is an object of the present invention to provide a method and an apparatus for transmitting broadcast data by means of a cyclic delay diversity in an OFDM mobile communication system.

In order to accomplish the aforementioned object, according to one aspect of the present, there is provided a method for transmitting broadcasting data by a transmitter using cyclic delay diversity in an Orthogonal Frequency Division Multiplex (OFDM) mobile communication system, the method comprising the steps of setting each transmitter to have different delay values, the transmitter providing a service to adjacent service areas; generating OFDM signals including the broadcasting data by each of the transmitters; delaying the OFDM signals by means of the different delay values; and transmitting the delayed OFDM signals by means of each transmitting apparatus.

In order to accomplish the aforementioned object, according to one aspect of the present, there is provided an apparatus for transmitting broadcast data using cyclic delay diversity in an Orthogonal Frequency Division Multiplex (OFDM) mobile communication system, the apparatus comprises an OFDM signal generator for generating OFDM signals including the broadcasting data; a cyclic delayer for delaying the OFDM signals by means of a delay value different from the delay value of adjacent service areas; and an antenna unit for transmitting the delayed OFDM signals.

In order to accomplish the aforementioned object, according to one aspect of the present invention, there is provided an apparatus for transmitting broadcasting data using cyclic delay diversity in an Orthogonal Frequency Division Multiple (OFDM) mobile communication system, the apparatus comprising a cyclic delay controller for setting each transmitter to have different delay values, the transmitter providing a service to adjacent service areas; and a plurality of transmitters for transmitting OFDM signals delayed according to the different delay values, the transmitter comprises an OFDM signal generator for generating the OFDM signals including the broadcasting data, a cyclic delayer for delaying the OFDM signals by means of a delay value different from the delay value of the adjacent service areas, and an antenna unit for transmitting the delayed OFDM signals.

BRIEF DESCRIPTION OF THE DRAWINGS

The above and other objects, features and advantages of the present invention will be more apparent from the following detailed description taken in conjunction with the accompanying drawings, in which.

DETAILED DESCRIPTION OF EXEMPLARY EMBODIMENTS

An exemplary embodiment of the present invention will be described in detail herein below with reference to the accompanying drawings. In the following description, a detailed description of known functions and configurations will be omitted for the sake of clarity and conciseness.

Embodiments of the present invention provide a macro-diversity scheme employing cyclic delay diversity in consideration of a plurality of service areas (cells or sectors) in an Orthogonal Frequency Division Multiplex Access (OFDMA)/Code Division Multiple Access (CDMA) mobile communication system.

In describing an embodiment of the present invention, it is assumed that one cell includes three sectors and a base station that is located in a central portion of the cell and includes independent antennas in the mobile communication system. Further, it is also assumed that each antenna transmits the same signals.

That is, it is necessary for the corresponding base station to consider a method for efficiently transmitting OFDM signals through the same broadcasting channel with reference to channel states of its own cell, a geographical location of a user terminal, or a multi-path of a corresponding cell.

Figure 2:
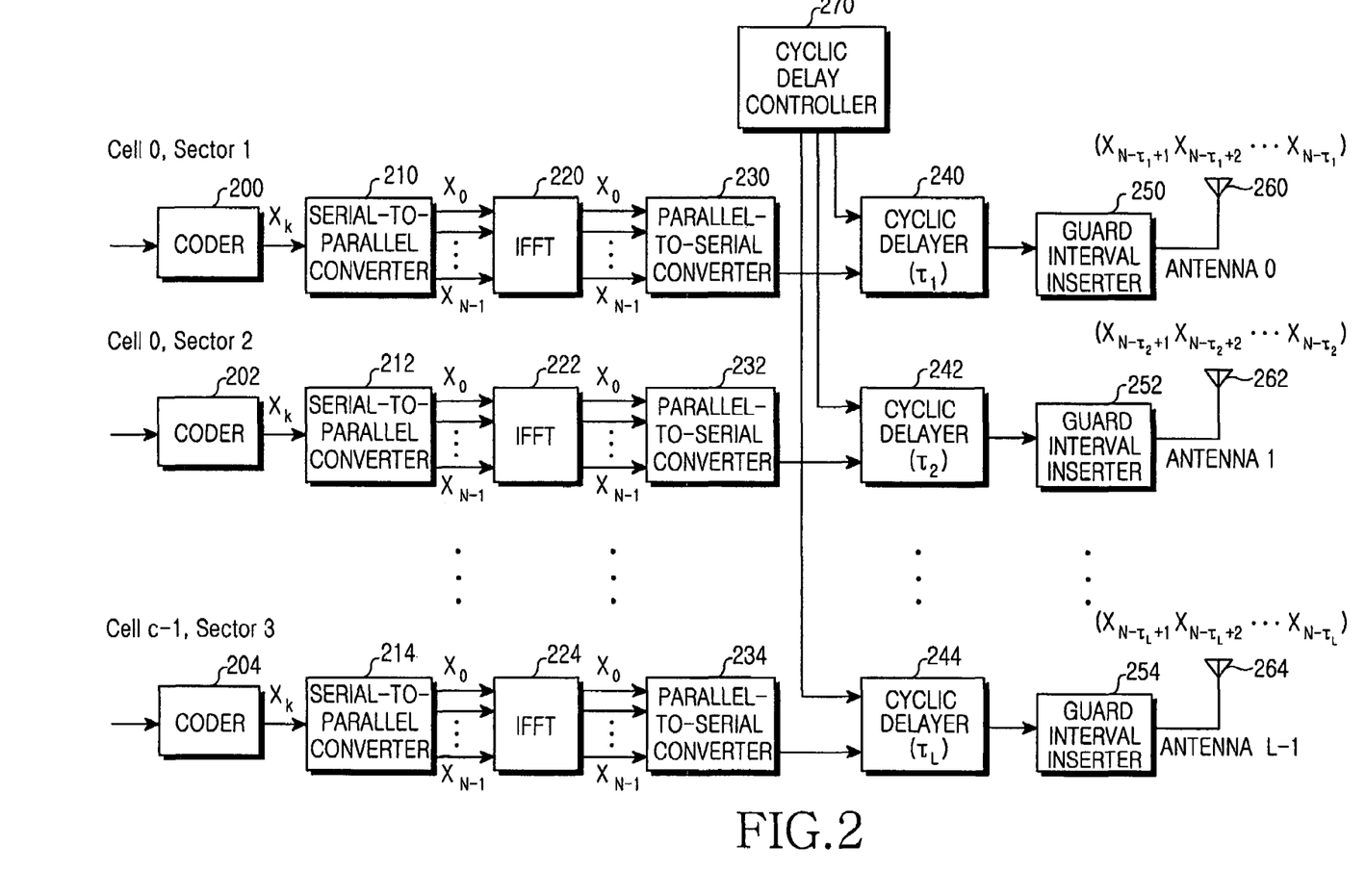
FIG. 2 is a block diagram of an OFDM/CDMA mobile communication system according to an embodiment of the present invention.

FIG. 2 is a block diagram of an OFDM/CDMA mobile communication system according to an embodiment of the present invention.

Referring to FIG. 2, a cyclic delay controller 270 applies the proper control signals to each sector constituting one cell. It is assumed that the cell is divided into three sectors making an angle of 120° with respect to each other according to an embodiment of the present invention. That is, the cyclic delay controller 270 sets cyclic delay variables of the sectors so that transmission signals of the sectors constituting the cell can satisfy full diversity. Herein, the cyclic delay controller 270 considers a hot spot area of a downtown area where user terminals are crowded, an outskirt area, a rural area, or a mountainous area where the number of neighbor cells are small. Further, the cyclic delay controller 270 assigns optimized cyclic delay variables in consideration of the number of user terminals, the number of neighbor cells, the number of sectors in a cell, and the like.

Then, the cyclic delay controller 270 synthesizes all channel information transmitted through the antennas corresponding to the sector, and transfers an optimal cyclic delay variable to a transmitter unit of a cell or a sector. The cyclic delay variable may be used as a preset value or a fixed value according to cells or sectors. It is possible to periodically update a preset cyclic delay variable before being used. The preset cyclic delay variable may be experimentally determined as an optimal value in consideration of a relation of peripheral cells and sectors in the course of designing cells of the mobile communication system.

It is possible to consider a hot spot area such as a downtown area where user terminals are crowded, an outskirt area, a rural area, or a mountainous area where the number of neighbor cells are small so that transmission signals can satisfy full diversity. Further, it is possible to experimentally determine the cyclic delay variables in consideration of the number of user terminals requesting a service, the number of neighbor cells, the number of sectors in a cell, and the like, and these values may be preset according to the cells or the sectors. The cyclic delay controller 270 may store the preset values and manage the cells or the sectors as a whole.

Referring to FIG. 2, for a first sector, a coder 200 codes a data sequence and outputs the coded data sequence $x_k$ to a serial-to-parallel converter 210. The serial-to-parallel converter 210 converts the coded data sequence $x_k$ to N samples of data and outputs the N samples of data in parallel to an IFFT unit 220. The IFFT unit 220 perform an IFFT for the N samples of data input from the serial-to-parallel converter 210, and outputs an N number of OFDM data samples data in parallel to a parallel-to-serial converter 230. The parallel-to-serial converter 230 receives the N number of OFDM data samples output from the IFFT unit 220, converts the OFDM data samples into serial data, and outputs the serial data.

Herein, the cyclic delay controller 270 applies a cyclic delay variable $\tau_1$ in order to maximize a diversity effect in a first antenna 260. The first antenna 260 generates cyclic delay signals $(x_{n-\tau1+1}, x_{n-\tau1+2}, \ldots, x_{n-\tau1})$ obtained by delaying an OFDM symbol signal $(x_0, x_1, \ldots x_{N-1})$ by $\tau_1$. The guard interval inserter 250 inserts G guard intervals into the cyclic delay signals $(x_{n-\tau1+1}, x_{n-\tau1+2}, \ldots, x_{n-\tau1})$. That is, the transmit antenna 260 corresponding to the first sector of the cell 0 transmits the cyclic delay signals $(x_{n-\tau1+1}, x_{n-\tau1+2}, \ldots, x_{n-\tau1})$ delayed by $\tau_1$.

For a second sector, a coder 202 codes a data sequence and outputs the coded data sequence $x_k$ to a serial-to-parallel converter 212. The serial-to-parallel converter 212 converts the coded data sequence $x_k$ into N number of data samples and outputs the N number of data samples in parallel to an IFFT unit 222. The IFFT unit 222 performs an IFFT for the N number of data samples input from the serial-to-parallel converter 212, and outputs N number of OFDM data samples in parallel to a parallel-to-serial converter 232. The parallel-to-serial converter 232 receives the OFDM sample data output from the IFFT unit 222, converts the OFDM sample data into serial data, and outputs the serial data. Herein, the cyclic delay controller 270 applies a cyclic delay variable $\tau_2$ in order to maximize the diversity effect in a second antenna unit 262. The second antenna unit 262 generates cyclic delay signals $(x_{n-\tau2+1}, x_{n-\tau2+2}, \ldots, x_{n-\tau2})$ obtained by delaying an OFDM symbol signal $(x_0, x_1, \ldots x_{N-1})$ by $\tau_2$. The guard interval inserter 252 inserts G guard intervals into the cyclic delay signals $(x_{n-\tau2+1}, x_{n-\tau2+2}, \ldots, x_{n-\tau2})$. That is, the transmit antenna unit 262 corresponding to the second sector of the cell 0 transmits the cyclic delay signals $(x_{n-\tau2+1}, x_{n-\tau2+2}, \ldots, x_{n-\tau2})$ delayed by $\tau_2$.

For a third sector, a coder 204 codes a data sequence and outputs the coded data sequence $x_k$ to a serial-to-parallel converter 214. The serial-to-parallel converter 214 converts the coded data sequence $x_k$ into N number of data samples and outputs the N number of data samples in parallel to an IFFT unit 224. The IFFT unit 224 performs an IFFT on the N number of data samples input from the serial-to-parallel converter 214, and outputs N number of OFDM data samples in parallel to a parallel-to-serial converter 234. The parallel-to-serial converter 234 receives the OFDM sample data output from the IFFT unit 224, converts the OFDM sample data into serial data, and outputs the serial data. Herein, the cyclic delay controller 270 applies a cyclic delay variable $\tau_L$ in order to maximize the diversity effect in the $L^{th}$ antenna unit 264. Accordingly, the $L^{th}$ antenna unit 264 generates cyclic delay signals $(x_{n-\tau L+1}, x_{n-\tau L+2}, \ldots, x_{n-\tau L})$ obtained by delaying an OFDM symbol signal $(x_0, x_1, \ldots, x_{N-1})$ by $\tau_L$. The guard interval inserter 254 inserts G guard intervals into the cyclic delay signals $(x_{n-\tau L+1}, x_{n-\tau L+2}, \ldots, x_{n-\tau L})$. That is, the transmit antenna unit 264 corresponding to an $L^{th}$ sector of the cell 0 transmits the cyclic delay signals $(x_{n-\tau L+1}, x_{n-\tau L+2}, \ldots, x_{n-\tau L})$ delayed by $\tau_L$. In the above description, it is assumed that the first sector and second sector belong to the same cell and that the third sector belongs to a different cell.

Table 1 below shows a scheme in which the cyclic delay controller 270 assigns cyclic delay variables to a predetermined cell and a corresponding sector. The first example shows a scheme for sequentially designating an order and assigning the cyclic delay variables without information for the channels. The second example shows a case where the cyclic delay variables are maximally assigned.

TABLE 1

| Cell Number | Sector Number | First example of cyclic delay variable assignment | Second example of cyclic delay variable assignment |
|---|---|---|---|
| 0 | 1 | 0 | 0 |
|   | 2 | 1 | N/4 |
|   | 3 | 2 | N/2 |
| 1 | 1 | 3 | 0 |
|   | 2 | 4 | N/4 |
|   | 3 | 5 | N/2 |
| 2 | 1 | 6 | 0 |
|   | 2 | 7 | N/4 |
|   | 3 | 8 | N/2 |
| 3 | 1 | 9 | 0 |
|   | 2 | 10 | N/4 |
|   | 3 | 11 | N/2 |
| 4 | 1 | 12 | 0 |
|   | 2 | 13 | N/4 |
|   | 3 | 14 | N/2 |
| 5 | 1 | 15 | 0 |
|   | 2 | 16 | N/4 |
|   | 3 | 17 | N/2 |

When the cyclic delay is N/2 in a state where an FFT size is N, a frequency selective fading for channel maximally occurs. When one cell is constructed by three sectors, the cyclic delay controller 270 can assign cyclic delay variables of 0, N/4 and N/2. Herein, the cyclic delay controller 270 continuously reflects the predetermined channel states.

Herein, the OFDM signal is constructed by N symbols (N is a natural number) having the same period as that of a CP and a maximum value of a delayed value is set as a half of the period of the N symbols.

Topographical and regional characteristics which must be considered when the cyclic delay controller 270 sets the cyclic delay variables are as follows.

1. Hot Spot Area of Downtown

The cyclic delay controller 270 assigns the proper cyclic delay variables after finding out the nearest cell and sector. A fixed cyclic delay scheme may be used according to the states of channels and the cyclic delay variables may be assigned to only several sectors.

2. Outskirt Area of Downtown and Rural Area

The cyclic delay controller 270 controls the cyclic delayers so that multiple paths can be sufficiently generated after finding out multi-path channel characteristics and the number of user terminals. A random cyclic delay scheme may therefore be simply adopted.

3. Mountainous Area where the Number of Neighbor Cells are Small

Because the mountainous area may be a blanket area, the cyclic delay controller 270 sets and controls cyclic delay variables so that many multiple paths can be generated.

As described above, the cyclic delay controller 270 provides the most appropriate cyclic delay variables to the cell and one or more sectors constituting the cell in consideration of topography and region of the cell, the number of user terminals, and the like. The cyclic delay variables may also be periodically updated. In FIG. 2, the coders 200, 202 and 204, the serial-to-parallel converter 210, 212 and 214, the IFFT unit 220, 222 and 224, and the parallel-to-serial converter 230, 232 and 234 form an OFDM signal generator.

Figure 3:
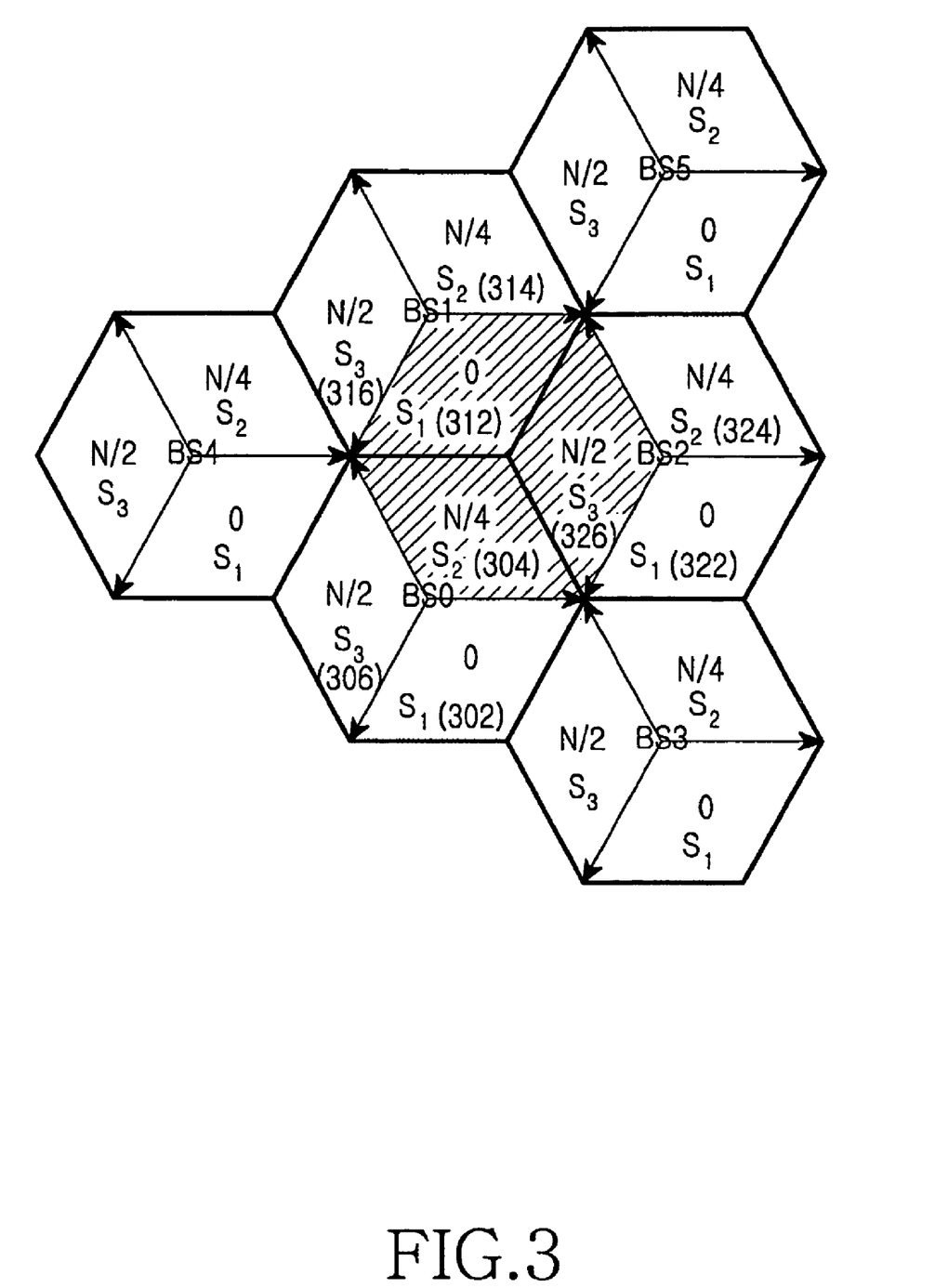
FIG. 3 is a diagram illustrating a structure of a cell and a sector to which a cyclic delay is applied according to an embodiment of the present invention.

FIG. 3 is a diagram illustrating a scheme for assigning cyclic delay variables according to an embodiment of the present invention.

Referring to FIG. 3, each cell includes three sectors. The cell 0, in which base station BS0 is located, represents the limit of application of a broadcasting channel transmitted from a base station BS0, the cell 1, in which base station BS1 is located, adjacent to the cell 0 represents the limit of application of a broadcasting channel transmitted from a base station BS1, and the cell 2, in which base station BS2 is located, represents the limit of application of a broadcasting channel transmitted from a base station BS2. The broadcasting channel may include a broadcasting channel used in a terrestrial broadcasting and a satellite broadcasting, a channel assigned for traffic such as a dedicated channel and a common channel used in a mobile communication system.

It is assumed that a random user terminal is located in an area being simultaneously serviced from the base stations BS0, BS1 and BS2 in cells 0, 1 and 2, respectively. Herein, three or more antennas in each cell transmit broadcasting channels with different cyclic delays set by the cyclic delay controller 270 of FIG. 2. Accordingly, the user terminal can obtain a frequency diversity gain through signals transmitted with different delay values.

For example, a user terminal may move to a hot spot area of downtown while receiving a broadcasting channel service, go through a secluded outskirt area, or pass through a secluded mountainous area. According to each case, a multipath channel has different characteristics. That is, when a user terminal receives broadcasting channel signals in the hot spot area of a congested downtown where the distance between cells is short and many neighboring cells exist, cells may receive the multi-path channel sufficiently even without a cyclic delay controller providing control signals for a cyclic delay. However, in the secluded outskirt area or the secluded mountainous area, an interval between the cells may increase and the multi-path channel may not be sufficiently received. Accordingly, the cyclic delay controller can set the cyclic delay variables through a location between cells and location information of a user terminal, and obtain a fading gain from the multi-path channel by means of the cyclic delay diversity modulation scheme. That is, when cyclically delayed signals are transmitted in consideration of channel characteristics in the topography and region where the user terminal is located for each cell or sector, it is possible to provide many more user terminals with a diversity gain and efficient service.

In relation to the above description, the cell 0 of the BS 0 is divided into three sectors with an angle of 120°. Therefore, virtual cells shown in cross-hatching are formed. All terminals in the virtual cells simultaneously receive broadcasting channel signals transmitted from each base station.

The portions cross-hatched receive the broadcasting channel signals of the BSs 0, 1 and 2. When different cyclic delays are assigned to each BS, all terminals in the virtual cells can obtain a diversity gain due to the cyclic delays. Further, because a maximum value of the cyclic delays is N/2, the BSs 1 and 2 assign the cyclic delays 0 and N/2, respectively, and the BS 0 assigns the cyclic delay N/4, which is an average value of the cyclic delays 0 and N/2.

Figure 4:
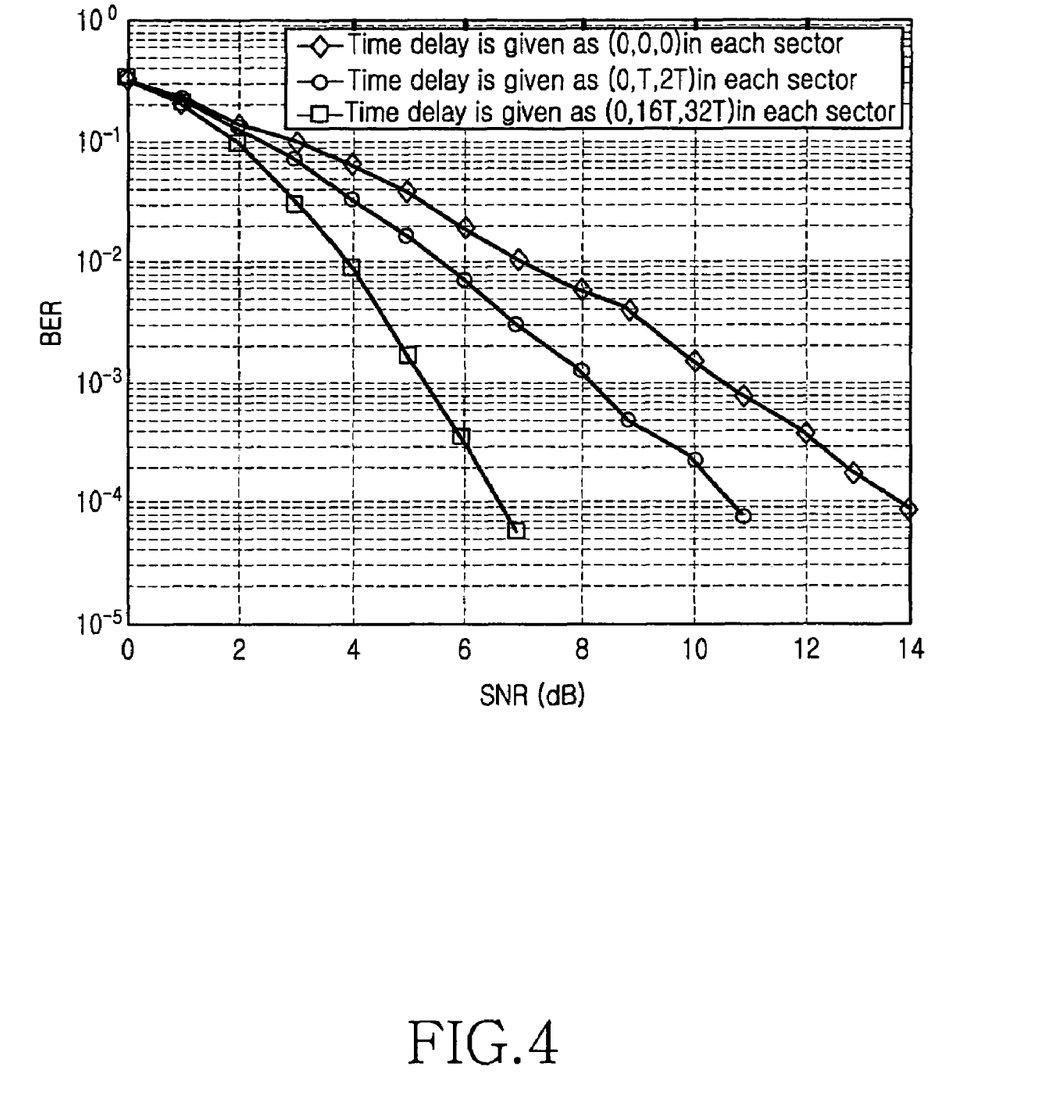
FIG. 4 is a diagram illustrating a comparison between bit error rates of the prior art and an embodiment of the present invention.

FIG. 4 is a diagram illustrating a performance comparison between an existing broadcasting channel to which the cyclic delay has not been applied and a broadcasting channel to which the cyclic delay has been applied according to an embodiment of the present invention. The channel performance represents the bit error rate (BER) performance according to a Signal-to-Noise ratio (SNR).

Table 2 below shows the OFDM system variables used in a simulation experiment.

TABLE 2

| Parameter | Setting value |
|---|---|
| FFT size | 64 |
| Channel length | 4 samples |
| Cyclic prefix | 4 samples |
| Channel profiles | Exponentially decaying power with 4 multi-path |
| Coding scheme | 64 states, 2/1 rate convolutional coding with soft viterbi decoding |
| Interleaving | 16 by 4 symbol interleaving |
| Modulation | QPSK |

In Table 2, the FFT size is 64 and the channel length and the cyclic prefix are set to 4.

A (16×4) symbol interleaving scheme is used as an interleaving scheme and a user terminal is located at the same distance from three or more cells.

Referring to FIG. 4, the first line with diamonds overlaid shows the case where the cyclic delay has not been applied to each sector according to an existing broadcasting channel scheme. That is, the user terminal simultaneously receives OFDM signals from the cells 0, 1 and 2 through the broadcasting channels.

The second line with circles overlaid shows a case where the cyclic delay applied to each sector has the same time delays of (0, T, 2T) as those applied to an existing MDDM. That is, the user terminal receives the OFDM signals from the cells 0, 1 and 2 with the delays of (0, T, 2T) through the broadcasting channels.

The third line with squares overlaid shows a case where the cyclic delay applied to each sector has time delays of (0, 16T, 32T). That is, the user terminal receives the OFDM signals from the cells 0, 1 and 2 with the delays of (0, 16T, 32T) through the broadcasting channels.

In the above description, a cell denotes an area serviced by one base station, shares only a control part, and includes a plurality of sectors having transmitters and transmit antennas, respectively. It is noted that this detailed construction does not limit embodiments the present invention and a cell or a sector may denote an area serviced by one transmit antenna.

According to embodiments of the present invention as described above, in the case of a broadcasting channel, a corresponding sector delays and transmits OFDM signals based on cyclic delay variables applied by a cyclic delay controller, so that a sufficient diversity gain can be obtained. Therefore, a user terminal can combine delayed signals, thereby receiving broadcasting channels more efficiently.

Embodiments of the present invention as described above can obtain the following effect.

When transmitting OFDM signals through broadcasting channels in a topography or a region where a gain is not sufficiently obtained by a multi-path fading channel, embodiments of the present invention transmit the cyclically delayed OFDM signals according to a delay controlled by a cyclic delay controller. Accordingly, a user terminal receives the OFDM signals through multiple paths, thereby obtaining a frequency diversity gain.

For example, a coded OFDM system performs a channel estimation for fading signals having selectively increased through multiple paths, thereby increasing a frequency diversity gain.

While the present invention has been shown and described with reference to certain exemplary embodiments thereof, it will be understood by those skilled in the art that various changes in form and details may be made therein without departing from the spirit and scope of the present invention as defined by the appended claims.

What is claimed is:

1. A method for transmitting broadcasting data using cyclic delay diversity in an Orthogonal Frequency Division Multiple (OFDM) mobile communication system, the method comprising the steps of:
   setting each transmitter to have different delay values, the transmitter providing a service to adjacent service areas;
   generating OFDM signals including the broadcasting data by said each transmitter;
   delaying the OFDM signals by means of the different delay values; and
   transmitting the delayed OFDM signals by means of each transmitter;
   wherein the generated OFDM signal is constructed by N symbols (N being a natural number) having a period identical to a period of a cyclic prefix and a maximum value of the different delay values is set as a half of the period of the N symbols.

2. The method as claimed in claim 1, wherein the different delay values of said each transmitter are periodically updated.

3. The method as claimed in claim 2, wherein the different delay values are set by considering a number of apparatuses receiving the broadcasting data or a number of the adjacent service areas.

4. The method as claimed in claim 1, wherein the service area includes a cell or a sector.

5. An apparatus for transmitting broadcasting data using cyclic delay diversity in an Orthogonal Frequency Division Multiple (OFDM) mobile communication system, the apparatus comprising:
   an OFDM signal generator for generating OFDM signals including the broadcasting data;
   a cyclic delayer for delaying the OFDM signals by means of a delay value different from the delay value of adjacent service areas; and
   an antenna unit for transmitting the delayed OFDM signals;
   wherein the cyclic delayer sets the delay value to be maximally spaced apart from the delay value of the adjacent service areas; and
   wherein the OFDM signal is constructed by N symbols (N being a natural number) having a period identical to a period of a cyclic prefix and a maximum value of the delay value is set as a half of the period of the N symbols.

6. The apparatus as claimed in claim 5, wherein the delay value is periodically updated.

7. The apparatus as claimed in claim 6, wherein the delay value is set by considering a number of apparatuses receiving the broadcasting data or a number of the adjacent service areas.

8. The apparatus as claimed in claim 5, wherein the service area includes a cell or a sector.

9. An apparatus for transmitting broadcasting data using cyclic delay diversity in an Orthogonal Frequency Division Multiple (OFDM) mobile communication system, the apparatus comprising:
   a cyclic delay controller for setting each transmitter to have different delay values, the transmitter providing a service to adjacent service areas; and a plurality of transmitters for transmitting OFDM signals delayed according to the different delay values;

the transmitter comprises an OFDM signal generator for generating the OFDM signals including the broadcasting data;
a cyclic delayer for delaying the OFDM signals by means of a delay value different from the delay value of the adjacent service areas; and
an antenna unit for transmitting the delayed OFDM signals,
wherein the cyclic delayer sets the delay value to be maximally spaced apart from the delay value of the adjacent service areas,
wherein the OFDM signal is constructed by N symbols (N being a natural number) having a period identical to a period of a cyclic prefix and a maximum value of the delay value is set as a half of the N symbols.

10. The apparatus as claimed in claim 9, wherein the delay value is periodically updated.

11. The apparatus as claimed in claim 10, wherein the delay value is set by considering a number of apparatuses receiving the broadcasting data or a number of the adjacent service areas.

12. The apparatus as claimed in one of claims 9, wherein the service area includes a cell or a sector.

* * * * *